United States Patent
Baumeister et al.

(10) Patent No.: US 6,618,595 B1
(45) Date of Patent: Sep. 9, 2003

(54) PROCESS AND ARRANGEMENT FOR EXECUTING PROTOCOLS BETWEEN TELECOMMUNICATIONS DEVICES IN WIRELESS TELECOMMUNICATIONS SYSTEMS

(75) Inventors: Josef Baumeister, Borken (DE); Ralf Rüther, Coesfeld (DE); Michael Beckers, Bocholt (DE); Christoph Euscher, Rhede (DE); Ulrich Bartsch, Bottrop (DE); Hans-Jürgen Loonen, Isselburg (DE); Sabine Hofschen, Münsing (DE); Rolf Biedermann, Hamminkeln (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/142,894

(22) PCT Filed: Mar. 12, 1997

(86) PCT No.: PCT/DE97/00493

§ 371 (c)(1),
(2), (4) Date: Sep. 14, 1998

(87) PCT Pub. No.: WO97/34425

PCT Pub. Date: Sep. 18, 1997

(30) Foreign Application Priority Data

Mar. 14, 1996 (DE) ......................................... 196 10 086

(51) Int. Cl.[7] .................................................. H04B 7/00

(52) U.S. Cl. ..................... 455/517; 455/560; 455/462

(58) Field of Search ................................. 455/462, 418, 455/419, 420, 517, 560; 370/229

(56) References Cited

U.S. PATENT DOCUMENTS 6,188,898 B1 * 2/2001 Phillips ..................... 455/433

FOREIGN PATENT DOCUMENTS

DE 195 45 762 C1 4/1997
WO WO 95/05040 2/1995

OTHER PUBLICATIONS

Campbell, G.M. et al, DCT 1800—A DECT Solution for Radio Access Application, vol. 71, No. 2, pp. 84–92.

Kuegle, B. et al, "Prodect 1.0 Software Package Fort DECT Home Phones", Siemens Components, vol. 30, No. 5, pp. 32–36.

Schmitt, M., Europaweit per DECT Mobil Ein Standard ermöglicht grenzenlose Mobil–kommunikation in allen Lebensbereichen, Telcom Report, vol. 17, No. 1, pp. 44/45.

Elberse, A., "DECT: The Ideal Telework Access Technology", IEE Colloquium on Teleworking and Teleconferencing, pp. 7/01–7/09.

Olander P., "Status and Future Activities" IEEE International Symposium On Personal, Indoor and Mobile Radio Communication, vol. 4, pp. 1064–1069.

DECT wird mit GAP herstellerunabhängig, Funkschau, vol. 68, No. 13, pp. 38–41.

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

(List continued on next page.)

Primary Examiner—Melur Ramakrishnaiah
(74) Attorney, Agent, or Firm—Bell, Boyd & Lloyd LLC (57) ABSTRACT

In a wireless telecommunication system, for example a DECT/GAP system, under the control jurisdiction of a first telecommunication apparatus of the telecommunication system control mechanisms (i.e. messages, information elements and procedures) of a standard protocol (e.g. a protocol according to the DECT/GAP standard) are activated for the execution of a special protocol, which serve for the exchange of additional items of information between the first telecommunication apparatus and a second telecommunication apparatus of the telecommunication system.

32 Claims, 5 Drawing Sheets

OTHER PUBLICATIONS

Telcom Report 16 (1993), No. 1, J. H. Koch: "Digitaler Komfort für schnurlose Telekommunikation—DECT–Standard eröffmet neue Nutzungsgebiete", pp. 26–27.

tec 2/93—Das technische Magazin von Ascom "Wege zur universellen mobilen Telekommunikation", pp. 35 to 42.

Components 31 (1993), No. 6, S. Althammer, D. Brückmann: Hochoptimierte IC's für DECT—Schnurlostelefone, pp. 215–218.

IEEE Communications Magazine, Jan. 1995, David D. Falconer et al, Time Division Multiple Access Methods for Wireless Personal Communications, pp. 50–57.

Informatik Spektrum 14, Jun. 1991, No. 3, Berlin, A. Mann, "Der GSM–Standard—Grundlage für dugutake europäische Mobilfunknetze", pp. 137–152.

Unterrichtsblätter—Deutsche Telekom Jg. 48, Feb. 1995, Protokolle am Beispiet des OSI–Referenzmodells, pp. 102–111.

* cited by examiner

PROCESS AND ARRANGEMENT FOR EXECUTING PROTOCOLS BETWEEN TELECOMMUNICATIONS DEVICES IN WIRELESS TELECOMMUNICATIONS SYSTEMS

BACKGROUND OF THE INVENTION

The invention relates to a method for executing protocols between telecommunication apparatuses of wireless telecommunication systems and to a wireless telecommunication apparatus for implementing.

Wireless telecommunication systems of the type designated above are message systems with a remote transmission path between a message source and a message sink for message processing and message transition, in which 1) the message processing and message transmission can take place in a preferred direction of transmission (simplex operation) or in both directions of transmission (duplex operation),
2) the message processing is analog or digital,
3) the message transmission over the remote transmission path is wireless—e.g. according to various radio standards such as DECT, GSM, WACS or PACS, IS-54, PHS, PDC, etc. (cf. IEEE Communications Magazine, January 1995, pages 50 to 57; D. D. Falconer et al: "Time Division Multiple Access Methods for Wireless Personal Communications").

"Message" is a higher-order term, which stands both for the meaning content (information) and also for the physical representation (signal). Signals can thereby represent for example (1) Images
(2) Spoken words
(3) Written words
(4) Encrypted words or images.

Figure 1:
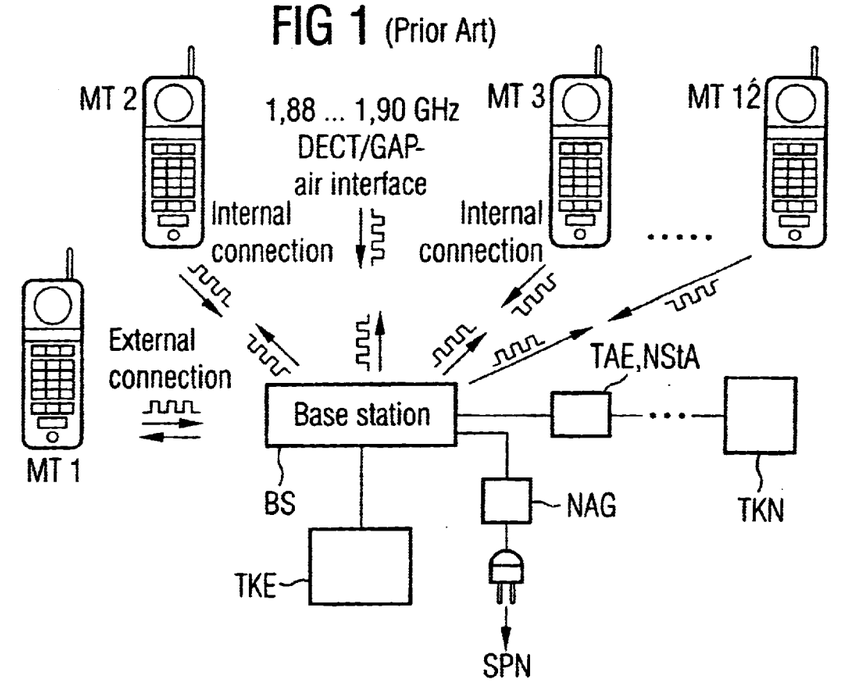
FIG. 1 depicts a prior art DECT/GAP system.

FIG. 1 shows, as a representative of the large number of wireless telecommunication systems, a DECT/GAP system in which, according to the DECT/GAP standard (Digital European Cordless Telecommunication; cf. (1): Nachrichtentechnik Elektronik 42 (1992) Jan./Feb. no. 1, Berlin, DE; U. Pilger "Struktur des DECT-Standards," pp. 23 to 29 in connection with ETSI publication ETS 300175-1 . . . 9, October 1992; (2): Telcom Report 16 (1993), no. 1, J. H. Koch: "Digitaler Komfort für schnurlose Telekommunikation—DECT-Standard eröffnet neue Nutzungsgebiete", pages 26 and 27; (3): tec 2/93—Das technische Magazin von Ascom "Wege zur universellen mobilen Telekommunikation", pages 35 to 42; Generic Access Profile; cf. ETSI Publication prETS 300444, April 1995, Final Draft, ETSI, FR), at a DECT/GAP base station BS, via a DECT/GAP air interface designed for the frequency range between 1.88 and 1.90 GHz, a maximum of twelve connections according to the TDMA/FDMA/TDD method (Time Division Multiple Access/Frequency Division Multiple Access/Time Division Duplex) are set up parallel to DECT/GAP mobile parts MT1 . . . MT12. The number 12 results from a number "k" of time slots or, respectively, telecommunication channels provided for the duplex operation of a DECT/GAP system (k =12). The connections can thereby be internal and/or external. Given an internal connection, two mobile parts registered at the base station BS, e.g. the mobile part MT2 and the mobile part MT3, can communicate with one another. For the setup of an external connection, the base station BS is connected with a telecommunication network TKN, e.g. in line-bound form via a telecommunication terminal unit TAE, or, respectively, a private branch exchange NStA, with a line-bound telecommunication network, or, according to WO 95/05040, in wireless form as a repeater station with a higher-order telecommunication network. Given the external connection, with a mobile part, e.g. with the mobile part MT1, it is possible to communicate with a subscriber in the telecommunication network TKN via the base station BS, the telecommunication terminal unit TAE, or, respectively, the private branch exchange NSTA. If, as in the case of the Gigaset 951 (Siemens cordless telephone, cf. Telcom Report 16, 1993, no. 1, pages 26 and 27), the base station BS has only one terminal to the telecommunication terminal unit TAE or, respectively, to the private branch exchange NSTA, then only one external connection can be set up. If, as in the case of the Gigaset 952 (Siemens cordless telephone, cf. Telcom Report 16, 1993, no. 1, pages 26 and 27), the base station BS has two terminals to the telecommunication network TKN, then in addition to the external connection with the mobile part MT1 a further external connection from a wire-bound telecommunication terminal apparatus TKE connected to the base station BS is possible. In principle, it is thereby also conceivable that a second mobile part, e.g. the mobile part MT12, instead of the telecommunication terminal apparatus TKE, uses the second terminal for an external connection. According to the subsequently published German Patent Application 195 45 762.5, the mobile parts MT1 . . . MT12 are operated in manual operation (normal operation) with a battery or an accumulator, and in hands-free operation are operated in connection with a charge station connected to a voltage network SPN. The base station, fashioned as a wireless small switching installation, is connected to the voltage network SPN via a network terminal apparatus NAG.

Figure 2:
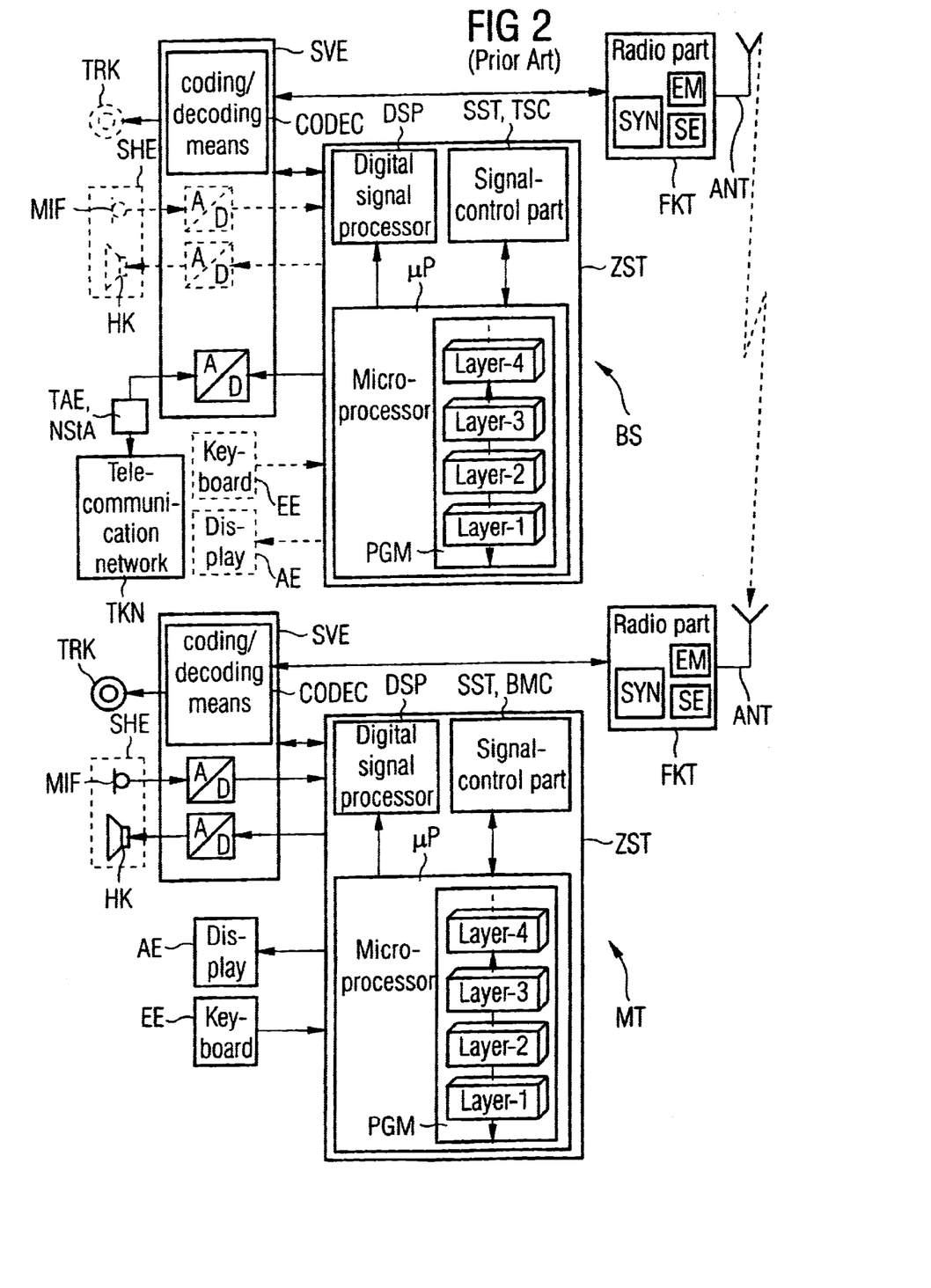
FIG. 2 is a block diagram of a prior art base station and mobile part.

FIG. 2 shows, on the basis of the reference Components 31 (1993), no. 6, pages 215–218; S. Althammer, D. Brückmann: "Hochoptimierte IC's für DECT-Schnurlostelefone," the circuit design of the base station BS and of the mobile part MT. The base station BS and the mobile part comprise, according to the reference, a radio part FKT with an antenna ANT allocated for the transmission and reception of radio signals, a signal processing means SVE, and a central control unit ZST, connected with one another in the manner shown. In the radio part FKT, essentially the known means, such as transmitter SE, receiver EM, and synthesizer SYN, are contained. Among other things, a coding/decoding means CODEC is contained in the signal processing means SVE. The central control unit ZST comprises, both for the base station BS and also for the mobile part MT, a microprocessor $\mu P$, having a program module PGM constructed according to the OSI/ISO layer model (cf. (1): Unterrichtsbl ätter—Deutsche Telekom no. 48, 2/1995, pp. 102–111; (2): ETSI publication ETS 300175-1 . . . 9, Oct. 1992), a signal control part SST, and a digital signal processor DSP, connected with one another in the manner shown. Of the layers defined in the layer model, only the first three layers (layer-1 . . . layer-3) immediately essential for the base station BS and the mobile part MT, as well as a fourth layer-4, designated as an IWU layer (InterWorking Unit) are shown. The signal control part SST is fashioned in the base station BS as a time switch controller TSC and in the mobile part MT as a burst mode controller BMC. The essential difference between the two signal control parts TSC, BMC is that the base-station-specific signal control part TSC takes over additional switching functions in relation to the mobile-part-specific signal control part BMC. The microprocessor µP is, according to the definition indicated above, a component of a microprocessor system.

The principle of the functioning of the switching units indicated above is described for example in the above-cited reference Components 31 (1993), no. 6, pages 215–218.

The specified circuit design according to FIG. 2 is supplemented in the base station BS and the mobile part MT by additional functional units according to their function in the DECT/GAP system according to FIG. 1.

The base station BS is connected with the telecommunication network TKN via the signal processing means SVE and the telecommunication terminal unit TAE or, respectively, the private branch exchange NSTA. As an option, the base station BS can also comprise a user interface (functional units drawn in with dotted lines in FIG. 2), consisting for example of an input means EE fashioned as a keyboard, a display means AE fashioned as a display, a speech/hearing means SHE fashioned as a handset with microphone MIF and earpiece HK, as well as a tone call bell TRK.

The mobile part MT comprises the user interface, possible as an option in the base station BS, with the above-described operating elements belonging to this user interface.

The communication between two arbitrary communication terminal apparatuses (communication partners) is regulated by means of protocols defined in a standard/defined as a norm (standard protocols), which establish the rules for the exchange of items of information between two communication partners on the same level of the ISO/OSI layer model.

In mobile radiotelephone communication, alongside the other mobile radiotelephone standards named above among others, the GSM standard with the GSM standard protocols (Groupe Spéciale Mobile or Global System for Mobile Communication; cf. Informatik Spektrum 14 (1991) June, no. 3, Berlin, D E: A. Mann: "Der GSM-Standard—Grundlage für digitale europäische Mobilfunknetze", pages 137 to 152) is to be cited.

In wireless communication, for example, alongside the other wireless standards named above among others, the already-mentioned DECT/GAP standard with the DECT/GAP standard protocols is to be cited.

Specifically, standard protocols define message and information formats, with the standard values belonging to the respective information elements, as well as procedures that define the chronological execution and the logical sequence of the message exchange.

In the protocols belonging to the DECT standard, in particular the information exchange between a mobile wireless communication terminal apparatus and the associated wireless fixed station is defined, whereby the communication medium is the air.

The GAP standard represents a subset of the DECT standard, with the aim that adherence to the protocol delimited in the GAP standard ensures manufacture-independent compatibility between the communication partners.

The DECT/GAP standard defines a) messages for the signaling of connection setup and connection tear-down as well as for mobility management, b) information elements within these messages, c) specific information elements that allow manufacturer-specific expansions, as well as d) procedures for setting up and tearing down connections, for the exchange of items of information (keystrokes, displays, tones, etc.), as well as for mobility management (application, encryption, authentification).

In addition, the GAP standard enables compatibility between different apparatuses in the context of a particular basic functionality (setup and tear-down of speech connections, mobility). Functionalities going beyond these be realized e.g. via a keypad protocol (exchange of keys). However, since these functionalities are not fixed in a protocol, compatibility between different equipment manufacturers and generations is no longer ensured. Rather, the additional performance features function according to the status quo only in communication systems specifically matched to one another, consisting of the mobile part and the base station of a quite particular generation of equipment.

Wireless communication terminal apparatuses with menu control and display are in addition distinguished by a local controlling of the performance features, as well as of the speech adjustment. This means that base-station-specific performance features are not offered in the menus. Wireless communication terminal apparatuses without menu control make use of a keypad protocol, concerning whose functionality the communication terminal apparatus is also not informed, rather, the user himself is informed by means of operating instructions valid for a specific type of fixed station.

In sum, this means that no intelligence or knowledge relating to the possibly existing base-station-specific performance features (callback, call-forwarding, etc.) is integrated into the wireless mobile parts. Only mobile-part-specific performance features, such as e.g. telephone directory or earpiece loudness, as well as limited GAP performance features, are available.

The control of resources, as well as the access to display, keys and tone/call sequences takes place locally in the wireless communication terminal apparatus.

This means that the display is in the possession of the mobile part (items of display information, which, packed by the fixed station—contained in GAP messages) can optionally be displayed in addition to/instead of the local items of display information; a prescription of how GAP display messages are to be handled, as well as agreement concerning character sets beyond the GAP standard character set (e.g., IA5 norm) is not part of the GAP standard.

A possible actuation of function key and menu keys is evaluated locally by the mobile part. The GAP channels for keystrokes provide only the numerals 0–9, *, #, as well as some specific GAP keys, such as e.g. "goto DTMF" (temporary dial changeover from IWV to MFV) and "pause." A foundation for a menu controlling by means of keystrokes is not part of the GAP standard.

Finally, there is no possibility that the calling sequence of the mobile part can be influenced by the base. The GAP standard does indeed offer the possibility of an outband signaling of tones and call sequences, but the interpretation of the values that are valid according to the GAP standard for the call sequences is left locally to the mobile part.

In the normal case, the execution of the GAP protocol serves for the exchange of information required for the setting up and tearing down of connections and for mobility management, as well as speech transmission.

From the DECT standard, it is in addition known (cf. ETS 300 175-1 October 1992, Chapter 8) to use specific information elements of the DECT standard protocol, e.g. the ESCAPE TO PROPRIETARY information elements, as "escape routes" for individual (user-related) protocols.

SUMMARY OF THE INVENTION

The underlying object of the invention is
(i) to remove the above-named disadvantages of the prior art,
(ii) to increase a quantity of information transmitted between telecommunication apparatuses connected via standardized air interfaces in wireless telecommunication systems given the execution of telecommunication-standard-specific protocols (standard protocols) in such a way that on the one hand the standard protocols can be further executed in unlimited fashion (maintenance of the interoperability of the telecommunication system) and on the other hand, by means of the additionally transmitted quantity of information, the wireless telecommunication system can be structured with respect to the systemimmanent telecommunication apparatuses.

In general terms the present invention is a method for the execution of protocols between telecommunication apparatuses of wireless telecommunication systems, in which, in the wireless telecommunication system with at least one first telecommunication apparatus and at least one second telecommunication apparatus, between the first telecommunication apparatus(es) and the second telecommunication apparatus(es), via a standardized interface. Standard-protocol specific messages are transmitted for the execution of a standard protocol. Information elements of the standard-protocol-specific messages are transmitted. A special protocol is executed with the information elements. The special protocol is executed under the execution and control jurisdiction of the first telecommunication apparatus.

Advantageous developments of the present invention are as follows.

Special procedures are executed in the context of the special protocol with which a multiplicity of special messages are transmitted, and with which the second telecommunication apparatus is adapted to the first telecommunication apparatus.

A first special procedure with which the items of information are exchanged between the first telecommunication apparatus and the second telecommunication apparatus according to the "silent call" principle, in such a way that this exchange of information is not acoustically perceptible.

With the first special procedure, items of special information for the disclosure of the performance feature "direct call" are transmitted from the first telecommunication apparatus to the second telecommunication apparatus.

The first special procedure is carried in the initial phase of the execution of the standard protocol.

A second special procedure is provided, in order to create the compatibility of the first telecommunication apparatus and the second telecommunication apparatus, first data with first items of data information of the second telecommunication apparatus are transmitted from the second telecommunication apparatus to the first telecommunication apparatus, whereby the first telecommunication apparatus creates the compatibility such that, if the first items of data information are less extensive than second items of data information of second data of the first telecommunication apparatus, the first items of data information form the basis of the compatibility, if the first items of data information are more extensive than, or equally extensive as, the second items of data information, the second items of data information form the basis of the compatibility.

The first data represent a first equipment class with at least one first class feature, allocated to a first equipment type of the second telecommunication apparatus(es). The second data represent at least one second equipment class with at least one second class feature, allocated to a second equipment type of the first telecommunication apparatus(es).

The first equipment class with the first class feature(s) is a first standard equipment class with at least one first standard class feature, or is a first special equipment class with at least one first special class feature. The second equipment class with the second class feature(s) is a second standard equipment class with at least one second standard class feature, or is a second special equipment class with at least one second special class feature.

For the parameterization of the first telecommunication apparatus, a third special procedure is carried out on the second telecommunication apparatus, with which third data, with third items of data information (divided into information classes) of the second telecommunication apparatus are transmitted from the second telecommunication apparatus to the first telecommunication apparatus.

For the parameterization of the first telecommunication apparatus, a fourth special procedure is carried out on the second telecommunication apparatus, with which fourth data, with fourth items of data information, are transmitted from the first telecommunication apparatus to the second telecommunication apparatus, whereby the fourth data with the fourth items of data information contain the third data with the third items of data information and fifth data with fifth items of data information of the first telecommunication apparatus.

The transmission of the fourth data is chronologically controlled by the information classes of the third items of data information in such a way that the fourth data are transmitted in distributed fashion at predetermined time intervals in the standard protocol transmission.

A fifth special procedure, is provided with which sixth data with sixth items of data information are transmitted from the first telecommunication apparatus to the second telecommunication apparatus for the controlling of physical resources of the second telecommunication apparatus.

With the fifth special procedure, the first telecommunication apparatuses and the second telecommunication apparatus can access the physical resources in distributed fashion or, respectively, can take possession of the physical resources in distributed fashion (distributed access/possession).

The physical resources are display, keys and/or tones.

The items of data information transmitted with the second special procedures, the third special procedures, the fourth special procedures, and the fifth special procedures are transmitted with the first special procedure.

The first telecommunication apparatus is a wireless base station, and the second telecommunication apparatus is a wireless mobile part.

The first telecommunication apparatus is a wireless mobile part, and the second telecommunication apparatus is a wireless base station.

The wireless mobile part is a DECT-specific wireless mobile part, and the wireless base station is a DECT-specific wireless base station.

A wireless mobile part is a GAP-specific wireless mobile part, and the wireless base station is a GAP-specific wireless base station.

The first telecommunication apparatus is a mobile radiotelephone base station/mobile radiotelephone switching installation, and the second telecommunication apparatus is a mobile radiotelephone mobile part.

The first telecommunication apparatus is a mobile radiotelephone mobile part, and the second telecommunication apparatus is a mobile radiotelephone base station/mobile radiotelephone switching apparatus.

The mobile radiotelephone mobile part is a GSM-specific mobile radiotelephone mobile part, and the mobile radiotelephone base station/mobile radiotelephone switching installation is a GSM-specific mobile radiotelephone base station/mobile radiotelephone switching apparatus.

The present invention is also a wireless telecommunication apparatus, which, as a first telecommunication apparatus for the execution of protocols between a wireless second telecommunication apparatus in a wireless telecommunication system, via a standardized air interface transmits standard-protocol-specific messages for the execution of a standard protocol, transmits elements of information of the standard-protocol-specific messages, and executes a special protocol with the information elements. Message transmission means are provided that, in connection with the second telecommunication apparatus, execute the special protocol, and, in addition, possess the execution and control jurisdiction.

The underlying idea of the invention is that, in a wireless telecommunication system under the control jurisdiction of a first telecommunication apparatus of the telecommunication system (e.g. according to claim 16, of the fixed or, respectively, base station, or, according to claim 17 of the mobile part), control mechanisms (i.e. messages, information elements and procedures) of a standard protocol (e.g., a protocol according to the DECT/GAP standard) for the execution of a special protocol are activated, which serve for the exchange of additional items of information between the first telecommunication apparatus and a second telecommunication apparatus of the telecommunication system.

It is thereby advantageous that
  the interoperability of a subsystem of the communication system, consisting of a wireless mobile part or of a wireless fixed station, is maintained with GAP systems (interoperability),
  with the special protocol, telecommunication apparatuses of different chronological and/or regional origin are adapted (compatibility),
  with the special protocol, flexible mobile parts and fixed stations, in particular wireless mobile parts and wireless fixed stations according to the DECT/GAP standard, of different equipment generations are integrated to form a single communication system, whereby different instances of the scope of performance of the overall communication system result for each allocation of a mobile part type to a type of fixed station (parameterization of the system),
  the performance scope of the overall system accessed by the mobile part is increased by functions of the respective fixed station that are unknown to the mobile part (integration of the performance spectra) of distributed systems),
  the special protocol achieves a coordination of distributed associated features (resource coordination of distributed systems).
  that the controlling of the communication system is parameterized, whereby
    the foundation for the parameterization is creation by an organization of various wireless equipment types into classes,
    an exchange procedure for the disclosure of the equipment class is a component of the special protocol,
    equipment of one equipment class is handled uniformly,
    different equipment classes are operated differently,
    equipment of different equipment classes are automatically handled according to the greatest possible commonality,
    future equipment remains retroactively compatible.
  basic and performance features are coordinated in distributed fashion in menu-controlled overall systems, whereby
    the user of the mobile part is offered all performance features of the base station and of the mobile part in a menu,
    the menus of the mobile part can be remotely controlled by the fixed station,
    the controlling of the performance features inherent to the different terminal systems takes place in distributed fashion, i.e., that the procedures of the special protocol enable a coordination of the performance features distributed to the end systems,
    the wireless mobile part has no knowledge concerning the performance features of the fixed station, which means savings of code and memory space in the mobile part,
    the fixed station does not need to know the semantics of the performance features in the mobile part,
    the fixed station receives items of information concerning the local performance features present in the mobile part with the aid of the procedures from the special protocol, by means of the exchange of particular codes for the recognition of the performance features,
    the performance features in the mobile part are classified; in this way there results an organization of arbitrary local performance features that is useful for the future,
    the fixed station decides in flexible fashion, by means of class membership, which of the performance features are inserted into the menus in which states,
    by means of class membership, the fixed station also imports performance features of future mobile parts into the menus, although these are not yet currently known (parameterization of the wireless fixed stations to various mobile part generations),
    the setting of the regional language takes place locally in the wireless mobile part, but is remotely controlled automatically in the fixed station by means of a procedure of the special protocol.
  the controlling of the physical resources is distributed whereby
    the purely local resource controlling of display, keys and tones in the mobile part can be canceled upon respective request by the fixed station, by means of a procedure of the special protocol,
    the fixed station can grasp the permanent and regulated jurisdiction authority via the display content of the mobile part (by means of a procedure of the special protocol),
    the fixed station, even if it is in the possession of the displayed display content, can access local special representations of the mobile part (by means of procedures of the special protocol),
    the fixed station, even if it is in the possession of the displayed display content, can again temporarily output the jurisdiction via the display for the purpose of calling up local performance features that are connected with a provisional local menu controlling,
    beyond the standard protocol (e.g. the GAP protocol), special procedures exist for the display and the flash controlling of the dialing numerals, which enable a blinking of the dialing numerals immediately after the time of the selection of the respective numeral by means of the switching technology of the fixed station; in the status quo, a flash control takes place only locally in the mobile part, thus even before the transmission of the respective numerals to the fixed station via the air, between the mobile part and the fixed station, there exists a procedure in the special protocol for agreement concerning the setting of the character sets for display and keyboard, the user notices nothing of the two virtual displays of the mobile part (local, remote-controlled), i.e. the display appears as a unity, beyond the known key codes, additional key codes can be defined (function keys, etc.), for the purpose of a menu controlling, the fixed station can remotely operate the function keys and menu keys of the mobile part, by requesting the key codes of these keys and keeping the mobile part remote from a local evaluation of the keys, the fixed station, even if it has achieved the remote controlling via the function keys and menu keys, can temporarily again grant the mobile part jurisdiction over the key evaluation, the wireless fixed station, if it wishes to make use of an outband signaling of the call tones, has the possibility of configuring the call signaling in the mobile part (by means of items of information that can be transmitted with the aid of the special protocol), the design existing in the telecommunication standard (e.g. DECT/GAP standard) can be used for the setup and tear-down of speech connections for the exchange of communication-apparatus-specific characteristics, whereby no additional outlay arises, since existing channels are used, the exchange of information serves to disclose performance features of the mobile part in the application phase, the information exchange can serve to disclose particular basic restrictions (direct call design).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 3:
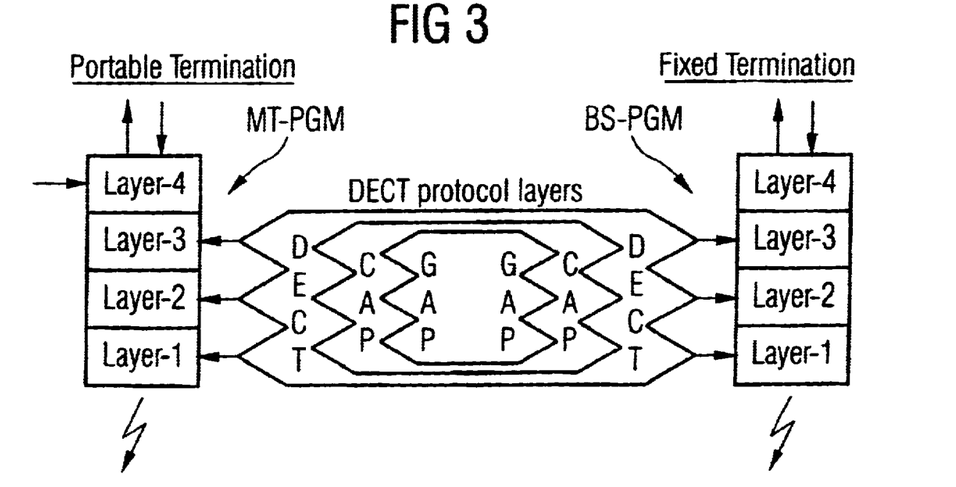
FIG. 3 shows, on the basis of the known DECT/GAP system according to FIG. 2, the data exchange on the levels (ISO/OSI layers) of the program modules via the DECT/GAP air interface.

FIG. 3 shows, on the basis of the known DECT/GAP system according to FIG. 2, the data exchange on the levels (ISO/OSI layers) of the program modules PGM of the base station BS and the mobile part MT via the DECT/GAP air interface. In order to distinguish the program modules PGM, the program module PGM of the base station BS is designated as a base-station-specific program module BS-PGM, and the program module PGM of the mobile part MT is designated as a mobile-part-specific-specific program module MT-PGM. In the nomenclature of the DECT/GAP standard, with the DECT/GAP standard protocols to be executed via the DECT/GAP air interface, the base station BS is designated a fixed termination FT, and the mobile part MT is designated as a portable termination PT.

FIG. 3 shows, in a schematic view, the "PT⇌FT" data transmission that takes place via the DECT/GAP air interface on the first three layers, the layer-1, designated the physical layer, the layer-2, designated the link layer, and the layer-3, designated the network layer, on the basis of the DECT standard protocol, of the GAP standard protocol, and of a special protocol serving as a supplement (link) to these protocols. The special protocol is a component of a proprietary (Siemens-specific) protocol profile, the common access profile CAP. The essential content of the common access profile is the exchange of "ESCAPE TO PROPRIETARY" information elements defined in the DECT standard (ETP information elements) by means of DECT/GAP messages.

program module PGM of the mobile part MT is designated as a mobile-part-specific program module MT-PGM. In the nomenclature of the DECT/GAP standard, with the DECT/GAP standard protocols to be executed via the DECT/GAP air interface, the base station BS is designated a fixed termination FT, and the mobile part MT is designated as a portable termination PT.

FIG. 3 shows, in a schematic view, the "PT⇌FT" data transmission that takes place via the DECT/GAP air interface on the first three layers, the layer-1, designated the physical layer, the layer-2, designated the link layer, and the layer-3, designated the network layer, on the basis of the DECT standard protocol, of the GAP standard protocol, and of a special protocol serving as a supplement (link) to these protocols. The special protocol is a component of a proprietary (Siemens-specific) protocol profile, the common access profile CAP. The essential content of the common access profile is the exchange of "ESCAPE TO PROPRIETARY" information elements defined in the DECT standard (ETP information elements) by means of DECT/GAP messages. Moreover, by means of the common access profile, optional GAP elements provided as an option in the GAP standard are taken over as CAP elements, and points and procedures not finally regulated in the GAP standard are defined.

Figure 4:
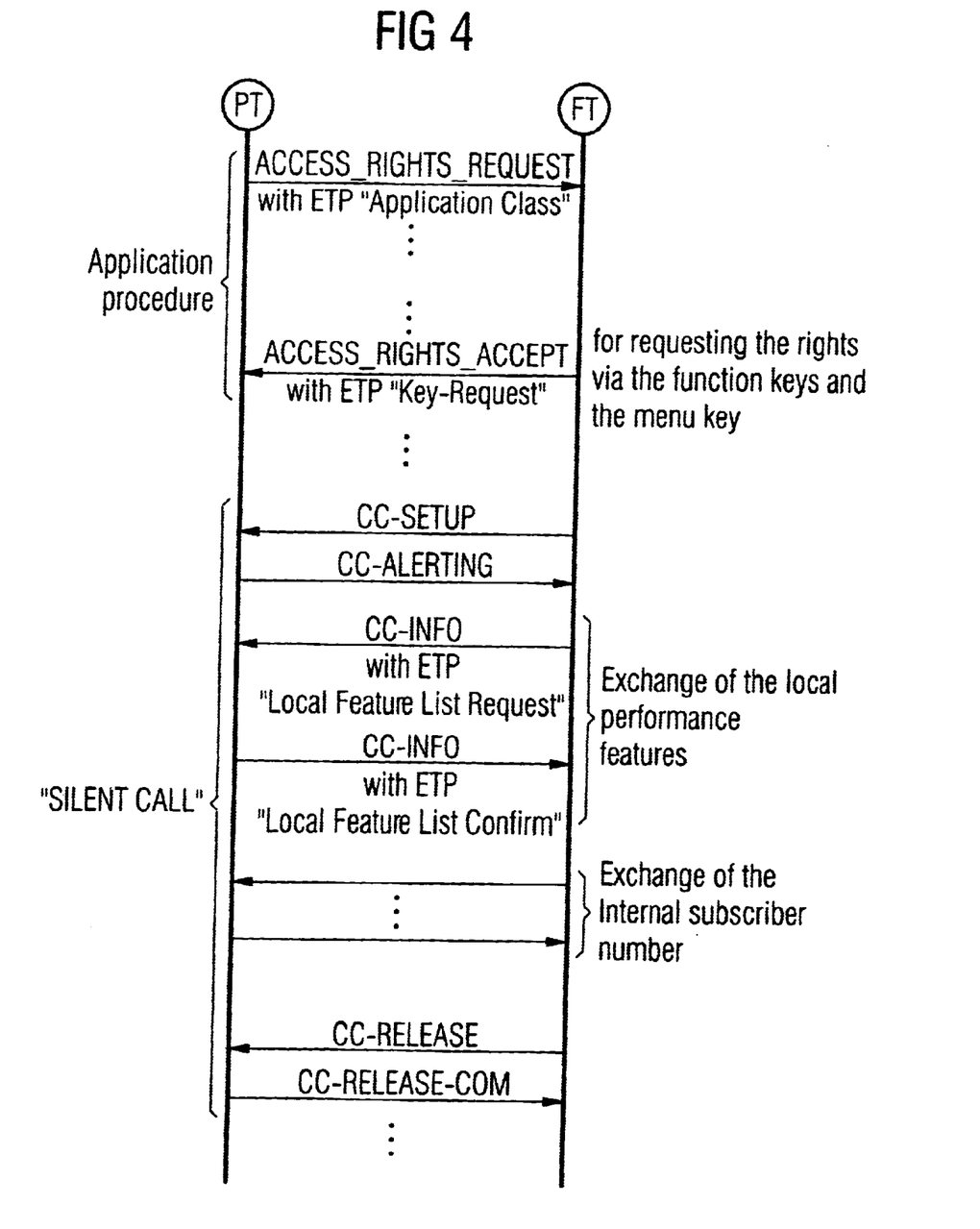
FIGS. 4–6 show event-state diagrams of the special protocol (common access profile) as an additional protocol to the DECT standard protocol and the GAP standard protocol according to FIG. 3.
Figure 5:
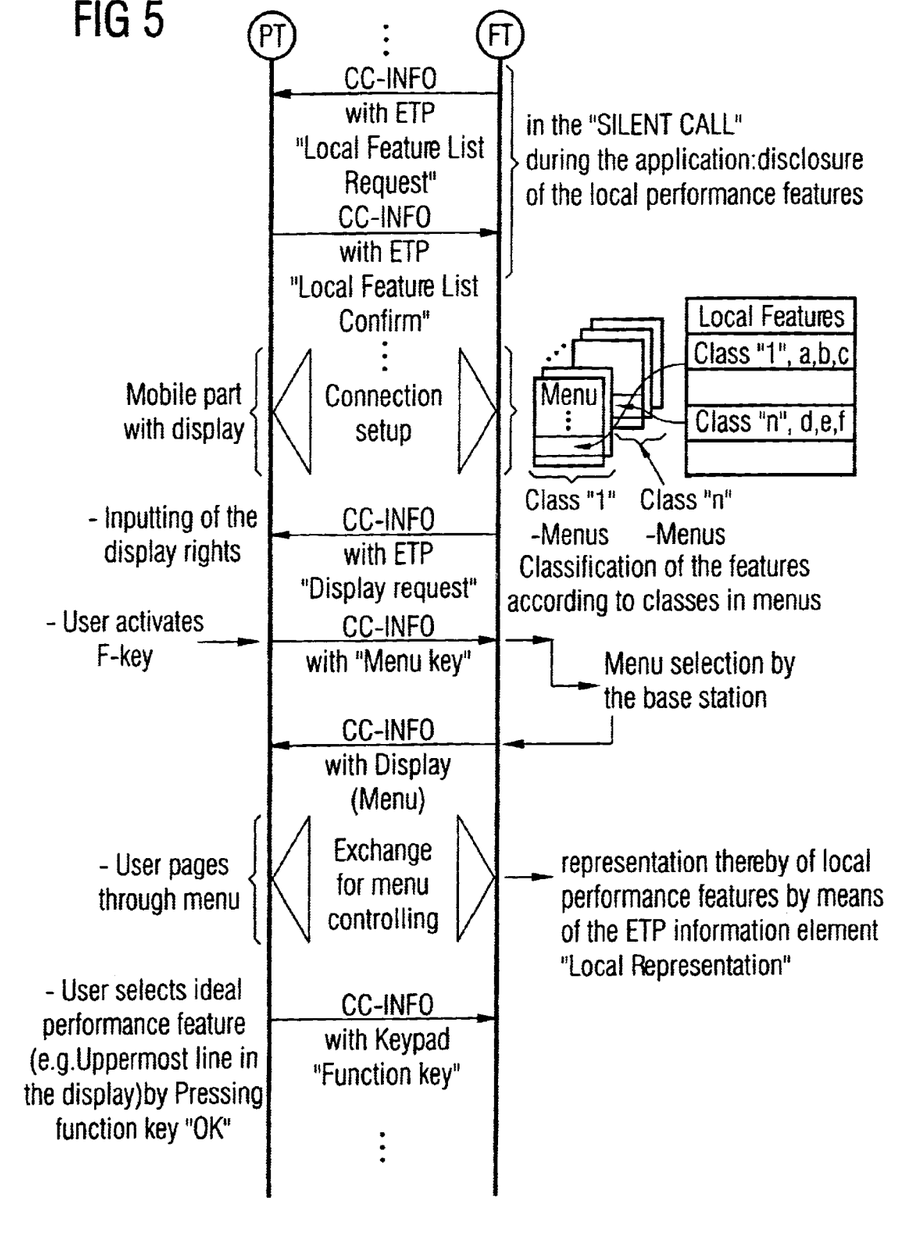
Figure 6:
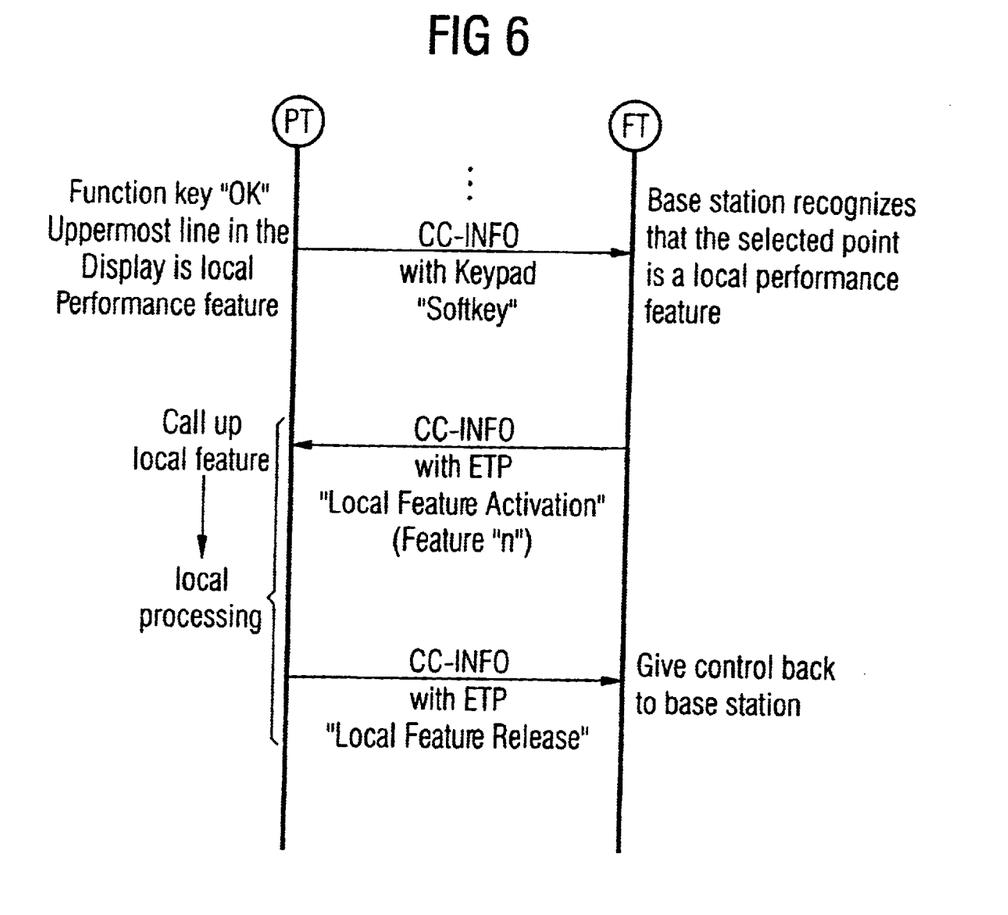

FIGS. 4–6 show, on the basis of FIG. 3, various event-state diagrams of the common access profile.

In the form of an event-status diagram, FIG. 4 shows a first message flow wherein ETP information elements, via DECT/GAP messages, are exchanged between the base station BS fashioned as a Fixed Termination FT and the mobile part MT fashioned as a Portable Termination PT. Particularly shown are a logon procedure and a silent call procedure.

The logon procedure starts with the mobile part MT, PT transmitting an "ACCESS-RIGHTS-REQUEST" message with an INFO information element "Application Class" to the base station BS, FT; the transmission occurring according to the DECT/GAP standard. On the basis of the INFO information element "Application Class", the mobile part MT, PT informs the base station BS, FT of its device class (application class).

The logon procedure is subsequently continued as known according to the DECT/GAP standard. At the end of the logon procedure, the base station BS, FT transmits an "ACCESSRIGHTS-ACCEPT" message with an INFO information element "KEY-REQUEST" to the mobile part MT, PT. On the basis of the INFO information element "KEY-REQUEST", the base station BS, FT requests the rights (e.g., user and access rights) via software keys referred to as soft keys, and menu keys of the mobile part MT, PT as far as a mobile part having menu and soft keys is concerned.

The silent call procedure starts with the base station BS, FT transmitting a "CC-SETUP" message for initiating a call setup to the mobile part MT, PT. In contrast to the initiation of a call setup provided in the DECT standard, whereby the "CC-SETUP" message always contains a SIGNAL information element, this information element is not present with respect to the "Silent Call" procedure. Therefore, a silent call setup is signalized to the mobile part MT, PT, so that the mobile part MT, FT cannot be acoustically perceived. The mobile part MT, PT, however, transmits a "CC-ALTERING" message as is conventional with respect to the DECT-specific call setup, as a confirmation of the received "CC-SETUP" message so to speak.

In the framework of the silent call procedure, the base station BS, FT subsequently transmits a "CC-INFO" message, with an ETP information element "LOCAL FEATURE LIST REQUEST", to the mobile part MT, PT. On the basis of this message, the mobile part MT, PT is asked to communicate its local performance features to the base station BS, FT.

As a response to this message, the mobile part MT, PT transmits the "CC-INFO" message, with an ETP information element "LOCAL FEATURE LIST CONFIRM", to the base station BS, FT. On the basis of this ETP information element "LOCAL FEATURE LIST CONFIRM", the mobile part MT, PT informs the base station BS, FT of its local performance features, so that an exchange of the performance features occurred as a result.

In the framework of the silent call procedure, internal subscriber numbers are subsequently exchanged by a message flow between the base station BS, FT and the mobile part MT, PT before the base station BS, FT, for terminating the silent call procedure, transmits a "CC-RELEASE" message to the mobile part MT, PT and before the mobile part MT, PT transmits a "CC-RELEASE-CON" message, as a response to this message, to the base station BS, FT; the message flow being specified in the DECT/GAP standard.

In the form of an event-status diagram, FIG. 5 shows a second message flow wherein ETP information elements are exchanged again, via DECT/GAP messages, between the base station BS fashioned as a Fixed Termination FT and the mobile part MT fashioned as a Portable Termination PT.

In the framework of the silent call procedure (see FIG. 4), preferably local performance features are made known at the beginning of the message flow in that the base station BS, FT transmits the "CC-INFO" message, with the ETP information element "LOCAL FEATURE LIST REQUEST", to the mobile part MT, PT, whereby the mobile part MT, PT is thus asked to communicate its local performance features to the base station BS, FT.

As a response to this message, the mobile part MT, PT transmits the "CC-INFO" message, with the ETP information element "LOCAL FEATURE LIST OPTION," to the base station BS, FT. On the basis of the ETP information element "LOCAL FEATURE LIST OPTION", the mobile part MT, PT informs the base station BS, FT of its local performance features in the form of local performance feature classes, so that an exchange of the performance features has occurred again as a result.

Subsequently, a connection setup, which is specified in the DECT/GAP standard, occurs between the base station BS, FT and the mobile part MT, PT.

In the message flow diagram of the FIG. 5, the mobile part MT, PT is a mobile part having a display and a menu control. In this case, the base station BS, FT transmits the "CC-INFO" message, with an ETP information element "DISPLAY REQUEST", to the mobile part MT, PT and thus requests the display rights of the mobile part MT, PT. The mobile part MT, PT subsequently releases the display rights.

If the user subsequently operates an F-key at the mobile part MT, PT, the mobile part transmits the "CC-INFO" message, with a KEYPAD-information element "MENUTASTE" (menu key), to the base station BS, FT.

Subsequently, the base station BS, FT carries out a menu selection and transmits the selected menu to the mobile part MT, PT in that it transmits the "CC-INFO" message, with a DISPLAY information element "MENU", to the mobile part MT, PT, whereby the base station uses the local performance feature classes as orientation for the menu selection.

The user of the mobile part MT, PT can now scroll in the selected menu. An exchange occurs with the menu control between the mobile part MT, PT and the base station BS, FT wherein local performance features are represented by an ETP information element "LOCAL REPRESENTATION".

If the user of the mobile part MT, PT then selects an ideal feature (e.g. top line at the display) by pressing the soft key "OK", the mobile part MT, PT transmits this information to the base station BS, FT in that it transmits the "CC-INFO" message, with a KEYPAD-information element "SOFTKEY", to the base station BS, FT.

In the form of an event-status diagram, FIG. 6 shows a third message flow wherein ETP information elements are exchanged again, via DECT/GAP messages, between the base station BS fashioned as a Fixed Termination FT and the mobile part MT fashioned as a Portable Termination PT.

The message flow starts with the mobile part MT, PT (see FIG. 5) transmitting the "CC-INFO", with the KEYPAD-information element "SOFTKEY", to the base station BS, FT. The base station BS, FT recognizes that the selected point at the display (top line) is a local feature and transmits the "CC-INFO", with an ETP information element "LOCAL FEATURE ACTIVATION", to the mobile part MT, PT. On the basis of the ETP information element "LOCAL FEATURE ACTIVATION", the mobile part MT, PT is informed of a local feature (e.g., the feature "n"). Subsequently, the local feature is called in the mobile part MT, PT and is locally processed before the mobile part MT, PT, by transmitting the "CC-INFO" message with an ETP information element "LOCAL FEATURE RELEASE" to the base station BS, FT, returns the control to the base station BS, FT.

What is claimed is:

1. A method for executing protocols between telecommunication apparatuses of wireless telecommunication systems, a respective wireless telecommunication system having at least one first telecommunication apparatus and at least one second telecommunication apparatus, and a standardized interface therebetween, comprising the steps of:

a) transmitting standard-protocol specific messages for executing a standard protocol between the at least one first telecommunication apparatus and the at least one second telecommunication apparatus;

b) transmitting information elements of the standard-protocol specific messages between the at least one first telecommunication apparatus and the at least one second telecommunication apparatus;

c) executing a special protocol with the information elements, under execution and control jurisdiction of the first telecommunication apparatus.

2. The method according to claim 1, wherein the method further comprises the steps of:

a) executing special procedures according to the special protocol;

b) transmitting a multiplicity of special messages via the special protocol; and c) adapting the second telecommunication apparatus to the first telecommunication apparatus via the special protocol.

3. The method according to claim 2, wherein a first special procedure of the special procedures exchanges items of information between the first telecommunication apparatus and the second telecommunication apparatus according to a "silent call" principle, such that this exchange of information is not acoustically perceptible.

4. The method according to claim 3, wherein with the first special procedure, items of special information for disclosure of a performance feature "direct call" are transmitted from the first telecommunication apparatus to the second telecommunication apparatus.

5. The method according to claim 3, wherein the first special procedure is carried in an initial phase of the execution of the standard protocol.

6. The method according to claim 2, wherein the method further comprises: a second special procedure, with which, for providing compatibility of the first telecommunication apparatus and the second telecommunication apparatus, first data with first items of data information of the second telecommunication apparatus are transmitted from the second telecommunication apparatus to the first telecommunication apparatus, whereby the first telecommunication apparatus creates the compatibility according to the following:

a) if the first items of data information are less extensive than second items of data information of second data of the first telecommunication apparatus, the first items of data information form the basis of the compatibility, b) if the first items of data information are more extensive than, or equally extensive as, the second items of data information, the second items of data information form the basis of the compatibility.

7. The method according to claim 6, wherein the first data represents a first equipment class with at least one first class feature, allocated to a first equipment type of the at least one second telecommunication apparatus, and wherein the second data represents at least one second equipment class with at least one second class feature, allocated to a second equipment type of the at least one first telecommunication apparatus.

8. The method according to claim 7, wherein a) the first equipment class with the at least one first class feature is a first standard equipment class with at least one first standard class feature, or is a first special equipment class with at least one first special class feature, b) the second equipment class with the at least one second class feature is a second standard equipment class with at least one second standard class feature, or is a second special equipment class with at least one second special class feature.

9. The method according to claim 6, wherein for parameterization of the first telecommunication apparatus, a third special procedure is carried out on the second telecommunication apparatus, with which third data, with third items of data information of the second telecommunication apparatus are transmitted from the second telecommunication apparatus to the first telecommunication apparatus.

10. The method according to claim 9, wherein for parameterization of the first telecommunication apparatus, a fourth special procedure is carried out on the second telecommunication apparatus, with which fourth data, with fourth items of data information, are transmitted from the first telecommunication apparatus to the second telecommunication apparatus, whereby the fourth data with the fourth items of data information contain the third data with the third items of data information and fifth data with fifth items of data information of the first telecommunication apparatus.

11. The method according to claim 10, wherein the third item of data are divided into information classes and wherein transmission of the fourth data is chronologically controlled by the information classes of the third items of data information such that the fourth data are transmitted in distributed fashion at predetermined time intervals in a standard protocol transmission.

12. The method according to claim 10, wherein the method further comprises: a fifth special procedure, with which sixth data with sixth items of data information are transmitted from the first telecommunication apparatus to the second telecommunication apparatus for controlling physical resources of the second telecommunication apparatus.

13. The method according to claim 12, wherein with the fifth special procedure, the first telecommunication apparatus and the second telecommunication apparatus can access the physical resources in distributed fashion or, respectively, can take possession of the physical resources in distributed fashion.

14. The method according to claim 12, wherein the physical resources are at least one of display, keys and tones.

15. The method according to claim 12, wherein the items of data information transmitted with the second special procedures, the third special procedures, the fourth special procedures, and the fifth special procedures are transmitted with the first special procedure.

16. The method according to claim 1, wherein the first telecommunication apparatus is a wireless base station, and the second telecommunication apparatus is a wireless mobile part.

17. The method according to claim 16, wherein the wireless mobile part is a DECT-specific wireless mobile part, and the wireless base station is a DECT-specific wireless base station.

18. The method according to claim 16, wherein the wireless mobile part is a GAP-specific wireless mobile part, and the wireless base station is a GAP-specific wireless base station.

19. The method according to claim 1, wherein the first telecommunication apparatus is a wireless mobile part, and the second telecommunication apparatus is a wireless base station.

20. The method according to claim 19, wherein the wireless mobile part is a DECT-specific wireless mobile part, and the wireless base station is a DECT-specific wireless base station.

21. The method according to claim 19, wherein the wireless mobile part is a GAP-specific wireless mobile part, and the wireless base station is a GAP-specific wireless base station.

22. The method according to claim 1, wherein the first telecommunication apparatus is a mobile radiotelephone base station/mobile radiotelephone switching installation, and the second telecommunication apparatus is a mobile radiotelephone mobile part.

23. The method according to claim 22, wherein the mobile radiotelephone mobile part is a GSM-specific mobile radiotelephone mobile part, and the mobile radiotelephone base station/mobile radiotelephone switching installation is a GSM-specific mobile radiotelephone base station/mobile radiotelephone switching apparatus.

24. The method according to claim 1, wherein the first telecommunication apparatus is a mobile radiotelephone mobile part, and the second telecommunication apparatus is a mobile radiotelephone base station/mobile radiotelephone switching apparatus.

25. A wireless telecommunication apparatus, comprising:
a first telecommunication apparatus for executing protocols with a wireless second telecommunication apparatus in a wireless telecommunication system, via a standardized air interface;
standard-protocol-specific messages for executing a standard protocol transmitted from the first telecommunication apparatus to the second telecommunication apparatus;
elements of information of the standard-protocol-specific messages transmitted from the first telecommunication apparatus to the second telecommunication apparatus;
a special protocol with the information elements executed by the first telecommunication apparatus;
message transmission devices in the first telecommunication apparatus that, in connection with the second telecommunication apparatus execute the special protocol, and, in addition, possess execution and control jurisdiction.

26. The wireless telecommunication apparatus according to claim 25, wherein the message transmission devices carry out special procedures with the second telecommunication apparatus according to the special protocol,
with which a multiplicity of special messages are transmitted, and
with which the second telecommunication apparatus is adapted to the first telecommunication apparatus.

27. The wireless telecommunication apparatus according to claim 26, wherein the message transmission devices, in connection with the second telecommunication apparatus, carry out first, second, third, fourth and fifth special procedures according to the following:
a first special procedure of the special procedures exchanges items of information between the first telecommunication apparatus and the second telecommunication apparatus according to a "silent call" principle, such that this exchange of information is not acoustically perceptible;
a second special procedure, for providing compatibility of the first telecommunication apparatus and the second telecommunication apparatus, first data with first items of data information of the second telecommunication apparatus are transmitted from the second telecommunication apparatus to the first telecommunication apparatus, whereby the first telecommunication apparatus creates the compatibility according to the following:
a) if the first items of data information are less extensive than second items of data information of second data of the first telecommunication apparatus, the first items of data information form the basis of the compatibility,
b) if the first items of data information are more extensive than, or equally extensive as, the second items of data information, the second items of data information form the basis of the compatibility; for parameterization of the first telecommunication apparatus, a third special procedure is carried out on the second telecommunication apparatus, with which third data, with third items of data information of the second telecommunication apparatus are transmitted from the second telecommunication apparatus to the first telecommunication apparatus:
for parameterization of the first telecommunication apparatus, a fourth special procedure is carried out on the second telecommunication apparatus, with which fourth data, with fourth items of data information, are transmitted from the first telecommunication apparatus to the second telecommunication apparatus, whereby the fourth data with the fourth items of data information contain the third data with the third items of data information and fifth data with fifth items of data information of the first telecommunication apparatus; and
a fifth special procedure, with which sixth data with sixth items of data information are transmitted from the first telecommunication apparatus to the second telecommunication apparatus for controlling physical resources of the second telecommunication apparatus.

28. The wireless telecommunication apparatus according to claim 24 wherein the message transmission devices, in connection with the second telecommunication apparatus, carry out first, second third and fourth special procedures according to the following:
a first special procedure of the special procedures exchanges items of information between the first telecommunication apparatus and the second telecommunication apparatus according to a "silent call" principle, such that this exchange of information is not acoustically perceptible;
a second special procedure, for providing compatibility of the first telecommunication apparatus and the second telecommunication apparatus, first data with first items of data information of the second telecommunication apparatus are transmitted from the second telecommunication apparatus to the first telecommunication apparatus, whereby the first telecommunication apparatus creates the compatibility according to the following:
a) if the first items of data information are less extensive than second items of data information of second data of the first telecommunication apparatus, the first items of data information form the basis of the compatibility,
b) if the first items of data information are more extensive than, or equally extensive as, the second items of data information, the second items of data information form the basis of the compatibility;
for parameterization of the first telecommunication apparatus, a third special procedure is carried out on the second telecommunication apparatus, with which third data, with third items of data information of the second telecommunication apparatus are transmitted from the second telecommunication apparatus to the first telecommunication apparatus; and
for parameterization of the first telecommunication apparatus, a fourth special procedure is carried out on the second telecommunication apparatus, with which fourth data, with fourth items of data information, are transmitted from the first telecommunication apparatus to the second telecommunication apparatus, whereby the fourth data with the fourth items of data information contain the third data with the third items of data information and fifth data with fifth items of data information of the first telecommunication apparatus.

29. The wireless telecommunication apparatus according to claim 25, wherein the first telecommunication apparatus is a wireless base station, the second telecommunication apparatus being a wireless mobile part.

30. The wireless telecommunication apparatus according to claim 25, wherein the first telecommunication apparatus is a wireless mobile part, the second telecommunication apparatus being a wireless base station.

31. The wireless telecommunication apparatus according to claim 25, wherein the first telecommunication apparatus is a mobile radiotelephone base station, the second telecommunication apparatus being a mobile radiotelephone mobile part.

32. The wireless telecommunication apparatus according to claim 25, wherein the first telecommunication apparatus is a mobile radiotelephone mobile part, the second telecommunication apparatus being a mobile radiotelephone base station.

* * * * *